A. F. & G. A. TRACHTE.
TANK HEATER.
APPLICATION FILED MAR. 11, 1912.
1,061,147.
Patented May 6, 1913.
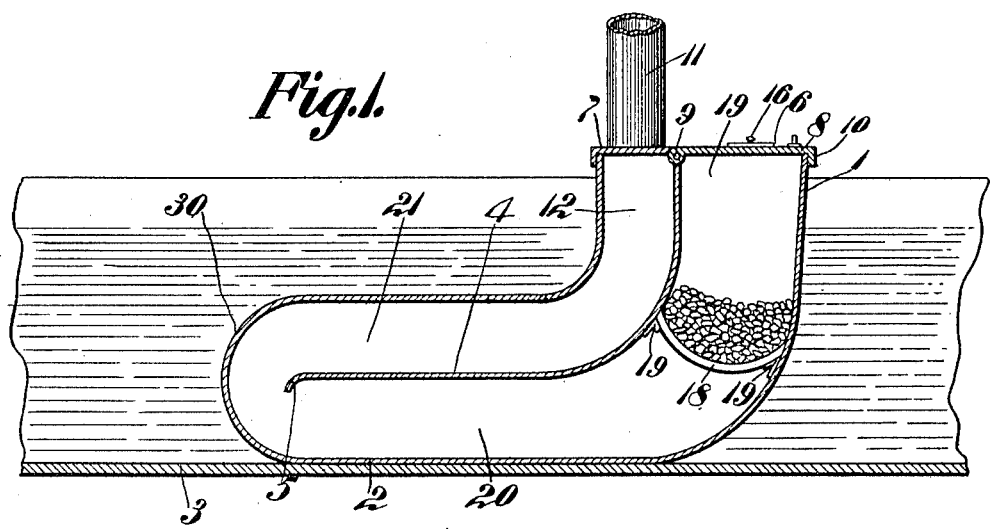
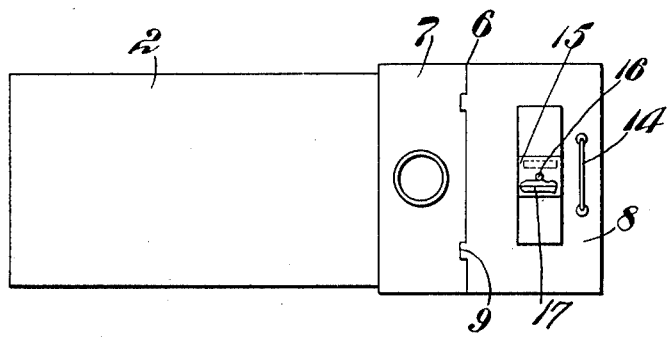
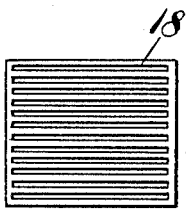
Arthur F. Trachte And
George A. Trachte,
Inventors
by C.A. Snow & Co.
Attorneys
Witnesses

UNITED STATES PATENT OFFICE.

ARTHUR F. TRACHTE AND GEORGE A. TRACHTE, OF MADISON, WISCONSIN.

TANK-HEATER.

1,061,147.   Specification of Letters Patent.   Patented May 6, 1913.

Application filed March 11, 1912. Serial No. 682,900.

*To all whom it may concern:*

Be it known that we, ARTHUR F. TRACHTE and GEORGE A. TRACHTE, citizens of the United States, residing at Madison, in the county of Dane, State of Wisconsin, have invented a new and useful Tank-Heater, of which the following is a specification.

The device forming the subject-matter of this application, is a heater, adapted to be employed for raising the temperature of tanks in which food for stock is contained.

The invention aims to provide a heater of this type which will be supported securely, against over-turning, upon the bottom of the tank, and to provide means whereby a maximum radiating surface in the heater will be obtained.

A further object of the invention is to equip a heater of this type with a division plate of novel and improved form, and so to position the fuel-holding grate with respect to the division plate that a maximum heating area will be obtained.

A further object of the invention is to improve generally, and to increase the utility of, devices of that type to which the present invention appertains.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawing,—Figure 1 shows in vertical longitudinal section, a heater constructed in accordance with the present invention, the same being mounted in place within the tank; Fig. 2 is a top plan of the heater; and Fig. 3 is a top plan of the grate.

The heater herein disclosed comprises a tubular body 1, vertically disposed when the device is in use, the body 1 being provided with an angular extension 2, adapted to lie along the bottom of the tank 3. The extension 2 is closed at its end, as indicated at 30.

Located within the body 1 and prolonged into the extension 2 is a division plate 4, conforming to the general shape of the heater, and extended entirely across the heater. As indicated at 5, one end of the division plate 4 is spaced from the closed end 30 of the extension 2, the closed end 30 preferably being rounded, to facilitate the draft around the end 5 of the division plate.

Mounted upon the open upper end of the body 1 is a closure, denoted generally by the numeral 6. The closure 6 includes a relatively fixed portion 7, to which a lid 8 is hinged, as shown at 9. If desired, the closure 6 may be equipped about its periphery with a depending flange 10, adapted to surround and to engage the outer open end of the body 1. Upstanding from the relatively fixed portion 7 of the closure 6 is a stack 11 which communicates with the air shaft 12 which is formed to one side of the division plate 4. The lid 8 is equipped with a suitable handle 14, and upon the lid is located a damper 15, provided with a handle 16, whereby the damper may be displaced, so as to disclose the draft openings 17 which are formed in the lid 8. A grate 18 of any desired construction is supported upon brackets 19, located at the point where the body 1 merges into the extension 2, the grate 18 being disposed in a substantially horizontal plane, and being dished downwardly to a slight extent. The space above the grate 18 constitutes a combustion chamber 19.

In practical operation, the heater hereinbefore described, is placed within the tank 3, the extension 2 of the heater resting upon the bottom of the tank. Owing to the relatively great length of the extension tube, as compared with the height of the body 1, the heater will not readily overturn in the tank. The fuel is placed upon the grate 18 and is ignited, the damper 15 being moved so as to uncover the draft openings. Under such circumstances, air will be drawn through the openings 17, the air passing through the fuel upon the grate 18 and traversing the space 20 below the division plate 4. The heated air will travel around the end 5 of the division plate, and be deflected by the curved end 30 of the extension 2, to enter the space 21 above the division plate, the heated air passing thence through the shaft 12 and out of the stack 11. Owing to the fact that the division plate 4 is placed within the heater, a maximum radiating surface is provided. The division plate 4 is heated to a high degree, owing to the fact that the fuel upon the grate 18 rests directly against the division plate, as clearly shown in Fig. 1. Owing to the fact that the fuel rests against the division plate 4, the air is heated to a high degree, just prior to the passage of the air through the stack 11, and consequently the draft through the stack is greatly increased. The division plate 4 affords an indirect draft through the heater, thereby giving a maximum radiating surface. The closure 6 may readily be lifted off the top of the heater, and the grate 18 may be lifted off its supporting brackets 19, thereby giving access to the interior of the device.

It is to be noted that the division plate 4 extends into flush relation with the upper end of the body 1 of the heater, and consequently the closure 6 is supported intermediate its edges, thereby preventing a sagging of the closure, when the closure is heated.

Having thus described the invention, what is claimed is:—

A tank heater comprising a tubular body having an angular extension, the extension being closed at its end and being adapted to lie along the bottom of a tank, entirely below the surface of the contents of the tank; a division plate located in the body and prolonged into the extension; the end of the division plate terminating short of the end of the extension; a grate located in the body and connecting the division plate with one side of the body, to define a combustion chamber, the space between the division plate and the other side of the body constituting a draft compartment; a closure mounted upon the upper end of the body and supported by one end of the division plate; a damper in the closure, communicating with the combustion chamber; and a stack carried by the closure, the stack communicating with the draft compartment.

In testimony that we claim the foregoing as our own, we have hereto affixed our signatures in the presence of two witnesses.

ARTHUR F. TRACHTE.
GEORGE A. TRACHTE.

Witnesses:
P. OSBORNE,
J. J. MCMANAMY.

---

Copies of this patent may be obtained for five cents each, by addressing the "Commissioner of Patents, Washington, D. C."